United States Patent
Spring

(10) Patent No.: US 6,709,025 B2
(45) Date of Patent: Mar. 23, 2004

(54) VAPOR LEAD-THROUGH SYSTEM FOR A ROTARY EVAPORATOR, AND A ROTARY EVAPORATOR

(75) Inventor: Arthur Spring, Flawil (CH)

(73) Assignee: Buchi Labortechnik AG, Flawil (CH)

( * ) Notice: Subject to any disclaimer, the term of this patent is extended or adjusted under 35 U.S.C. 154(b) by 8 days.

(21) Appl. No.: 09/783,127

(22) Filed: Feb. 15, 2001

(65) Prior Publication Data

US 2001/0020368 A1 Sep. 13, 2001

(30) Foreign Application Priority Data

Feb. 17, 2000 (EP) .............................................. 00810132

(51) Int. Cl.⁷ ................................................ F16L 27/00
(52) U.S. Cl. ........................ 285/272; 285/231; 285/234; 285/278; 285/281
(58) Field of Search ................................ 285/223, 231, 285/234, 272, 278, 280, 281

(56) References Cited

U.S. PATENT DOCUMENTS 2,532,669 A * 12/1950 Jones
4,660,866 A * 4/1987 Jones et al. .................. 285/231
5,243,836 A * 9/1993 Spring ......................... 277/405
6,375,233 B1 * 4/2002 Friedmann et al. ...... 285/136.1

FOREIGN PATENT DOCUMENTS

| DE | 1 519 744 | 6/1970 |
|----|-----------|--------|
| DE | 3114449 | 10/1982 |
| DE | 19710745 | 9/1998 |
| EP | 0 504 099 | 7/1995 |

* cited by examiner

Primary Examiner—Lynne H. Browne
Assistant Examiner—James M. Hewitt
(74) Attorney, Agent, or Firm—Shoemaker and Mattare

(57) ABSTRACT

A vapour lead-through system for a rotary evaporator with a rotatable evaporator vessel (5) and a stationary cooler (7) consists of a vapour lead-through tube (6) and a connection piece (8). The vapour lead-through tube (6) is on the cooler-side mounted in a stationary seal (9). On the evaporator-side end the vapour lead-through tube (6) is connected to the connection piece (8) in a manner such that the axis (A) of the vapour lead-through tube (6) is movable with respect to the axis (A') of the connection piece (8).

20 Claims, 3 Drawing Sheets

VAPOR LEAD-THROUGH SYSTEM FOR A ROTARY EVAPORATOR, AND A ROTARY EVAPORATOR

BACKGROUND OF THE INVENTION

The invention relates to a vapor lead-through system for a rotary evaporator and to a rotary evaporator.

Such vapor lead-through systems are already known, in which a vapor lead-through system connected to the evaporator flask is surrounded and driven by a drive part. The vapor lead-through system is led via a seal into or onto a static cooler. With this arrangement, the seals on account of the rotation are mechanically loaded and must be regularly replaced in order to guarantee the functioning and operational safety.

EP 504 099 shows an at least two-part vapor lead-through tube with which the end-faces of the static part as well as the rotatable part in contact with the drive part are formed as sealing surfaces, wherein materials which are as low-wear and as resistant as possible such as plastic materials are combined with ceramic or glass materials.

A disadvantage of the known vapor lead-through systems lies in the fact that the rotatable vapor lead-through tube is in direct contact with the drive part. The movement of the drive part which is in no way exactly concentric, leads to eccentric forces which act directly on the vapor lead-through tube. As a result, mechanical loading of the seals occurs.

DE 15 19 744 shows a vapor lead-through tube connected to the drive part, with a seal which is rigidly held by the radial extension of a flange but is held in a radially compensating manner between the sealing surfaces of the cooler and drive part. The radial sliding movement arising by way of this leads to a corresponding mechanical loading.

SUMMARY OF THE INVENTION

It is the object of the invention to avoid the disadvantages of the prior art, in particular thus to provide a vapor-lead-through system and a rotary evaporator with which eccentric forces on the seals are minimized and the wear resistance is increased.

According to the invention this object is achieved with a vapor lead-through system and with a rotary evaporator as described below.

By subdividing the vapor lead-through into a connection piece which is drivable with the drive part and connected or connectable to the evaporator vessel, and into a vapor lead-through tube rotatably mounted in a seal stationary with respect to a cooler, forces arising from the drive part act mainly upon the connection piece and where appropriate only on the evaporator-side end of the vapor lead-through tube. The transmission of eccentric forces from the connection piece in connection with the drive part onto the seal stationary with respect to the cooler is minimized in that the vapor lead-through tube is connected to the connection piece in a manner such that its axis is movable with respect to the axis of the connection piece. The vapor lead-through tube with respect to the stationary seal is, to a certain extent, decoupled from the drive piece.

It is particularly advantageous when the stationary seal bears sealingly on the outer wall of the vapor lead-through tube and has been manufactured in such a way and from such material that even under a heat and chemical effect it does not change in shape or pretension. This modified material, for example PTFE, also permits the stationary seal, during operation, to bear optimally at all times on the vapor lead-through tube. The independence of the vapor lead-through tube on the evaporator-side end, of an eccentric movement of the drive part, permits the application of such materials in the stationary seal since these also with eccentric movement of the drive part are only minimally mechanically loaded.

A stationary seal of an inert, friction-modified plastic, in particular PTFE, is particularly suitable for this. By way of the restoring properties of this PTFE reversible deformability is ensured. Furthermore PTFE is chemically resistant with regard to solvent-containing vapors and is friction-modifiable, by which means the mechanical loading by way of friction may be minimized.

Of course also other materials with suitable properties are conceivable.

It is particularly advantageous when the seal is held in a base body of an inert plastic, in particular PTFE.

A mounting of the stationary seal in a base body of an inert plastic has several advantages. The base body may likewise assume sealing functions. In particular the cooler-side end-face of the base body may be arranged such that it bears sealingly on a cooler-side connection piece.

A base body of an inert plastic, in particular PTFE, is particularly suitable, since various regions of the base body may be directly exposed to the solvent-containing vapors.

According to a preferred embodiment of the invention one design of the stationary seal as an annular body with a deformable lip is particularly favorable. Thereby the deformable lip assumes the sealing function and the annular body acts in a stabilizing manner.

Additional stability of the stationary seal is achieved by providing a first ring, in particular a steel ring, on the outer periphery of the base body and/or a second ring, in particular a steel ring, in the seal. Materials other than steel, which sufficiently stabilize the seal, might also be used.

The vapor lead-through tube may on the evaporator-side end be mounted in a seal whereby the outer wall of the vapor lead-through tube sealingly bears on the inner side of the seal.

Particularly suitable is an evaporator-side seal which in cross section is formed V-shaped. The inner and outer limbs of such a seal may be formed as sealing surfaces.

It is particularly advantageous when the evaporator-side seal on its outer side comprises a spherical surface and the connection piece comprises a taper-ground joint, wherein the spherical surface of the seal while forming a ball joint lies sealingly in the taper-ground joint of the connection piece. The ball joint permits in a particularly simple manner a movability of the evaporator-side seal to the connection piece and thus a compensation of an eccentric movement of the connection piece at the evaporator-side end of the vapor lead-through tube. Eccentric forces which occur at the connection piece being in connection with the drive part are thus particularly effectively compensated. Conceivable is also a kinematic reversal so that the vapor lead-through tube via a taper-ground joint bears on the outer side of the evaporator-side seal and the connection piece comprises a conical surface which is in contact with the inner side of the seal.

The evaporator-side seal preferably consists of an inert plastic, in particular PTFE, since this material has the required thermal resistance and solvent resistance. Conceivable however are also all other materials which have the mentioned properties.

An O-ring within the evaporator-side seal may be advantageous for the stability of the sealing arrangement. Particularly suitable is a rubber ring since it has the necessary elasticity in order to dampen radial forces in the ball joint.

By providing a stop in the axial direction on the evaporator-side end of the vapor lead-through tube, axial displacement of the vapor lead-through tube, in particular with a manipulation on the apparatus, may be avoided. The stop may be particularly simply realized when the vapor lead-through tube comprises a flange which is latchable on a retaining element on the drive part, e.g. in a groove with an O-ring. Other forms of the stop are possible.

BRIEF DESCRIPTION OF THE DRAWINGS

The invention is hereinafter described in more detail in embodiment examples by way of the drawings. There are shown in.

DESCRIPTION OF THE PREFERRED EMBODIMENT(S)

Figure 1:
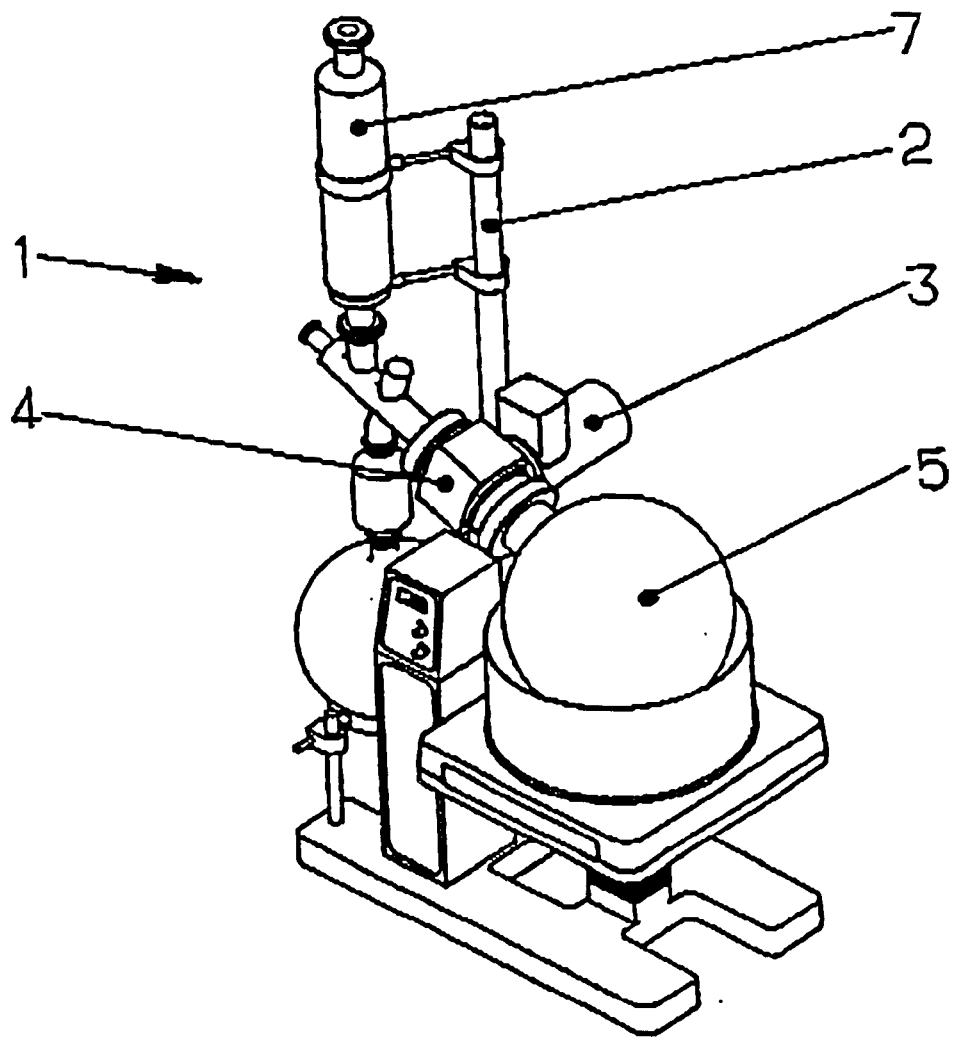
FIG. 1 is a perspective representation of a rotary evaporator.

FIG. 1 shows a rotary evaporator 1 with a stand 2 on which there is fastened a motor 3 which via a drive part 4 drives an evaporator vessel 5. Through the drive part 4 as a vapor lead-through arrangement there runs a vapor lead-through tube 6 (FIG. 2), through which the vapor rising from the evaporator vessel 5 is led into a cooler 7. With this the cooler 7 in a manner known is stationarily fastened.

Figure 2:
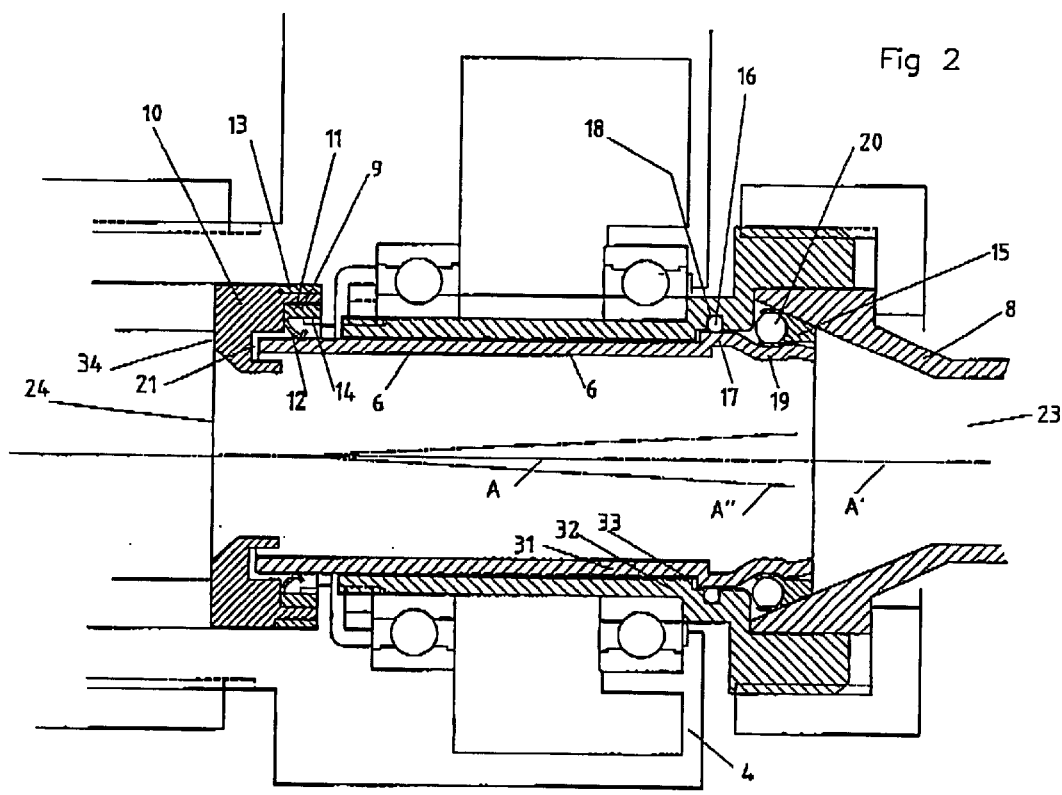
FIG. 2 is a longitudinal section through an embodiment example of a vapor lead-through system with the features of the invention.

FIG. 2 shows the arrangement of the vapor lead-through system. On the evaporator-side end 23 there is located a connection piece 8 which in the known manner is connected to an evaporator vessel 5. On the end facing the drive part 4, the connection piece 8 with its inner surface 27 which is formed as a taper-ground joint 25 bears on the outer limbs 29 of a seal 15 designed V-shaped in cross section (see FIG. 4). The outer surface 28 of the connection piece 8 is in contact with the drive part 4 so that the connection piece 8 is rotatable.

The vapor lead-through tube 6 is led through the drive part 4. On the evaporator-side end 23 the vapor lead-through tube 6 comprises a groove 19 into which the seal 15 V-shaped in cross section may be latched so that the vapor lead-through tube 6 is sealingly in connection with the inner limbs 30 of the seal 15. The V-shaped seal 15 comprises a conical surface 26 so that the vapor lead-through tube 6 is connected to the seal 15 and the connection piece 8 in the manner of a ball joint which is held together by forces in the axial direction (see FIG. 4). By way of the non-positive fit resulting with such an arrangement it is achieved that the vapor lead-through tube 6 by way of the connection piece 8 being in connection with the drive part 4 is set into a rotational movement.

Additionally the vapor lead-through tube 6 on the evaporator-side end 23 has a flange 17 which is latchable in a recess 18 of the drive part 4. Into the recess 18 there is applied a ring 16. By way of this a fixation of the vapor lead-through tube 6 in the axial direction is guaranteed. The vapor lead-through tube 6 from the evaporator-side end 23 is led through the drive part 4 into a stationary seal 9 on the cooler-side end 24 without at the same time the vapor lead-through tube 6 being in direct contact with the drive part 4. By way of this arrangement it is achieved that the vapor lead-through tube 6 is relatively movable with respect to the axis A of the drive part 4. Eccentric forces which are transmitted via the connection piece 8 onto the vapor lead-through tube 6 may thus be compensated by a movement shown in FIG. 2 as position AII and be kept away from the stationary seal 9. Between the outer wall 31 and the inner surface 32 of the drive part 4 there is provided an annular gap 33 which permits this compensation movement.

Figure 3:
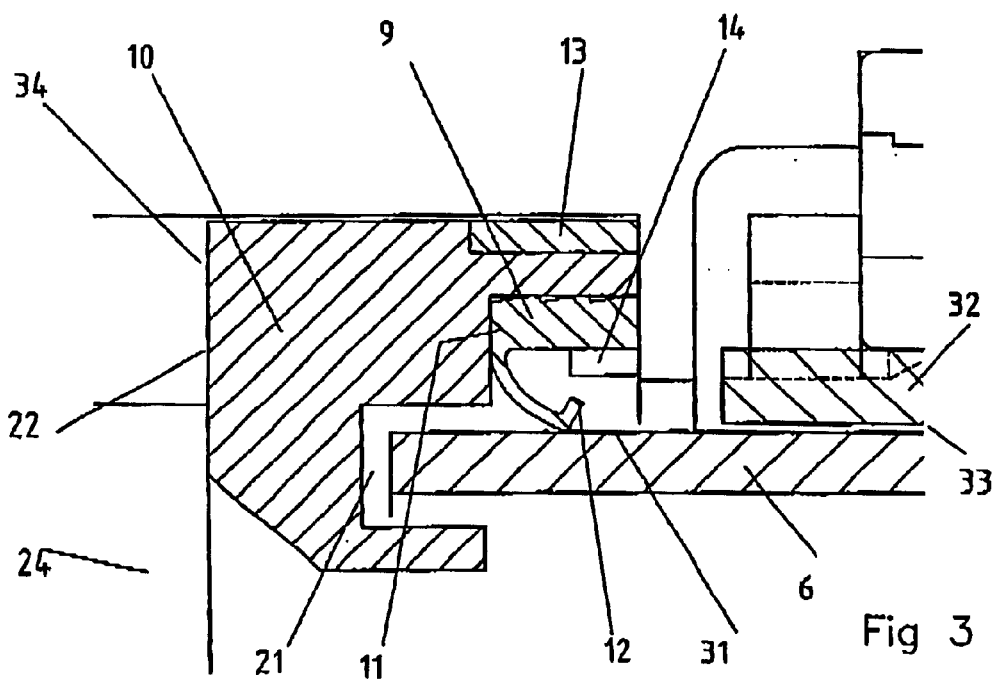
FIG. 3 is an enlarged representation of the cooler-side seal according to FIG. 2

FIG. 3 shows the cooler-side stationary seal 9. This bears sealingly on the outer wall 31 of the vapor lead-through tube 6 and is reversibly deformable under a heat effect. The actual sealing function is thereby assumed by a deformable lip 12 while the annular body 11 of the stationary seal 9 serves for the mounting. To have particularly proven itself is a stationary seal 9 of an inert, friction-modified plastic, in particular PTFE which has the necessary restoring properties. The stationary seal 9 is held by a base body 10 and is stabilized by way of a first ring 13 on the outer circumference and a second ring 14 in the inside of the stationary seal 9. The base body 10 comprises a circumferential recess 21 in which the vapor lead-through tube 6 is applied. The base body 10 has an end face 22 which bears on a sealing surface 34 of the cooler. By way of the arrangement shown in FIG. 3 parts of the base body 10 are directly in contact with the solvent containing vapors. Particularly suitable is a base body 10 of an inert plastic, in particular PTFE. The design of the base body 10 shown in FIG. 3 additionally acts sealingly with respect to the cooler-side back flow. For the vapor lead-through tube 6 and the cooler-side connection piece glass is particularly well suited.

Between the cooler-side connection piece and the base body 10 of the seal 9 no rotation takes place. The vapor lead-through tube 6 is in contrast rotatable with respect to the seal 9.

Figure 4:
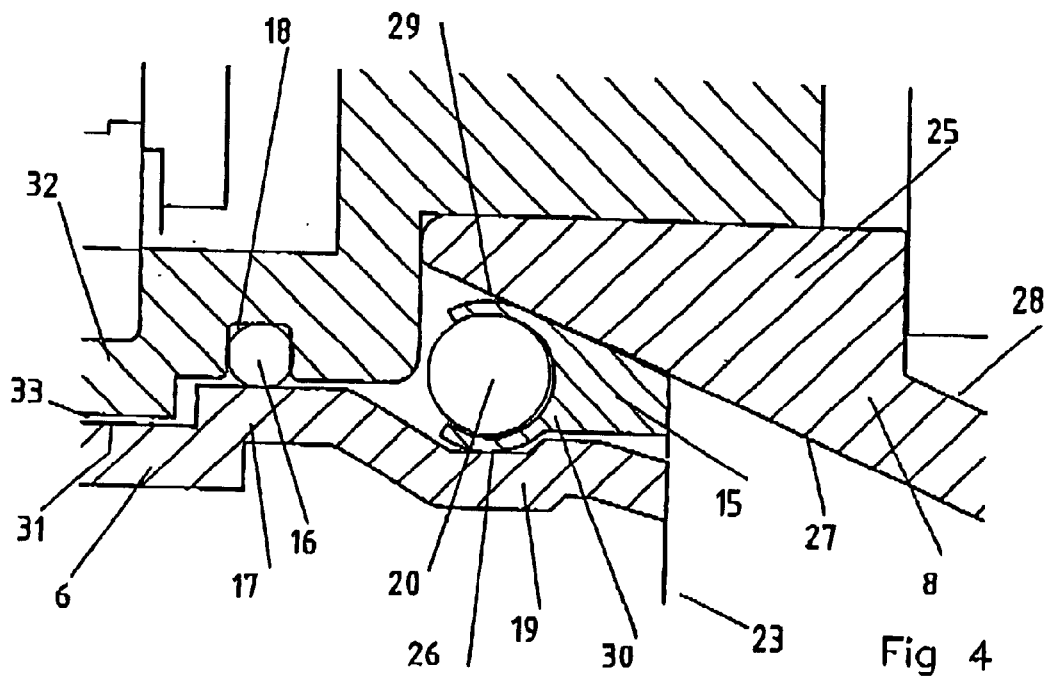
FIG. 4 is an enlarged representation of the evaporator-side seal according to FIG. 2.

FIG. 4 shows the evaporator-side seal 15 whose outer limbs 29 sealingly bear on the inner surface 27 of the connection piece 8, which is designed as a taper-ground joint 25. The inner limbs 30 of the seal 15 bear sealingly on the outer surface 31 of the vapor lead-through tube 6. The seal 15 may additionally be stabilized by an O-ring 20.

What is claimed is:

1. A vapor lead-through system for a rotary evaporator including a rotary evaporator vessel, a stationary cooler, a vapor lead-through connecting the evaporator vessel to the cooler, and a drive part for rotating the evaporator vessel, the vapor-lead through comprising a connection piece drivable by the drive part, said connection piece having a longitudinal axis and being connected to the evaporator vessel, a single vapor lead-through tube, said connection piece being drivable with the drive part and being connected or connectable to the evaporator vessel, said vapor lead-through tube being arranged within a seal at its cooler side end, said seal being stationary with respect to the cooler, and having a longitudinal axis, an evaporator end and a cooler end, and a stationary seal surrounding said cooler end of said tube, said seal comprising a deformable lip, and further comprising an annular gap between said yapor lead-through tube and said drive part adjacent the evaporator end of the tube, thus permitting the vapor lead-through tube to deviate radially with respect to the drive part to compensate for eccentric movement of the connection piece.

2. A vapor lead-through system according to claim 1, wherein said seal bears sealingly on the outer wall of the vapor lead-trough tube and is reversibly deformable under influence of heat.

3. A vapor lead-through system according to claim 1, wherein said seal consists of an inert, friction-modified plastic.

4. A vapor lead-through system according to claim 3, wherein said seal consists of PTFE.

5. A vapor lead-through system according to claim 1, wherein said seal is held in a base body of an inert plastic.

6. A vapor lead-through system according to claim 5, wherein said seal is held on a base body of PTFE.

7. A vapor lead-through system according to claim 5, wherein said base body bears sealingly on a connection piece of the cooler.

8. A vapor lead-through system according to claim 1, wherein said seal comprises an annular body.

9. A vapor lead-through system according to claim 1, further comprising a first ring on tie outer circumference of a base body, and a second ring within the seal.

10. A vapor lead-through system according to claim 9, wherein said first ring or said second ring is a steel ring.

11. A vapor lead-through system according to claim 1, wherein said vapor lead-through tube is mounted at the evaporator-side end by a seal in such a manner that the outer wall of the vapor lead-through tube sealingly bears on the inner side of the seal.

12. A vapor lead-through system according to claim 11, wherein said evaporator-side seal is V-shaped in cross section.

13. A vapor lead-through system according to claim 11, wherein said evaporator-side seal by way of axial forces is sealingly connected and in the circumferential direction movably connected to the connection piece.

14. A vapor lead-through system according to claim 11, wherein said evaporator-side seal on its outer side comprises a spherical surface and said connection piece comprises on its inner side a taper-ground joint, wherein the spherical surface of the seal while forming a ball joint sealing lies in the taper-ground joint of the connection piece.

15. A vapor lead-through system according to claim 11, wherein said seal on the evaporator-side end of the vapor lead-through tube is made of an inert plastic.

16. A vapor lead-through system according to claim 11, wherein said evaporator-side seal comprises an O-ring.

17. A vapor lead-through system according to claim 16, wherein said O-ring consists of rubber.

18. A vapor lead-through system according to claim 1, wherein said vapor lead-through tube at the evaporator side end comprises a flange for preventing displacement in the axial direction.

19. A vapor lead-through system according to claim 18, wherein said flange is latchable in a recess of the drive part.

20. A rotary evaporator including a rotatable evaporator vessel and a stationary cooler, a vapor lead-through assembly connecting the evaporator vessel to the cooler and a drive part for rotating the evaporator vessel, wherein the vapor lead-through assembly comprises a connection piece and a single vapor lead-through tube having a longitudinal axis, said connection piece has a longitudinal axis and is drivable with the drive part and is connected or connectable to the evaporator vessel, said vapor lead-through tube is arranged within a seal at its cooler side end, said seal being stationary with respect to the cooler and comprising a deformable lip, and an annular gap between said vapor lead-trough tube and said drive part adjacent the evaporator end of the tube, thus permitting the vapor lead-through tube to deviate radially with respect to the drive part, to compensate for eccentric movement of the connection piece.

* * * * *